United States Patent [19]

Hutton et al.

[11] Patent Number: 5,505,354

[45] Date of Patent: Apr. 9, 1996

[54] WEARABLE BAIT AND TACKLE BOX

[76] Inventors: James C. Hutton; Sondra Hutton, both of R.D. 1, Box 1021, Nescopeck, Pa. 18635

[21] Appl. No.: 343,701

[22] Filed: Nov. 21, 1994

[51] Int. Cl.$^6$ ............................................. B65D 83/00
[52] U.S. Cl. ..................... 224/196; 224/183; 224/162; 224/253; 224/920; 206/315.11; 221/185; 221/276
[58] Field of Search .................... 224/920, 253, 224/183, 162, 196; 362/154; 206/315.11; 43/54.1; 221/185, 287, 276, 247, 256, 271

[56] References Cited

U.S. PATENT DOCUMENTS

| | | | |
|---|---|---|---|
| D. 254,757 | 4/1980 | Rodstein | D2/400 |
| D. 263,519 | 3/1982 | Ader | D2/406 L |
| D. 342,831 | 1/1994 | Dise | D3/105 |
| 1,625,920 | 4/1927 | Thurman | 224/252 |
| 2,677,486 | 5/1954 | Schermerhorn | 224/199 |
| 2,999,621 | 9/1961 | Kiser | 224/183 |
| 3,317,097 | 5/1967 | Giordano | 224/920 |
| 3,490,169 | 1/1970 | Tweed | 206/315.11 |
| 3,680,750 | 8/1972 | Franco | 224/183 |
| 3,938,132 | 2/1976 | Cunningham | 340/321 |
| 4,151,938 | 5/1979 | Barker et al. | 224/183 |
| 4,697,379 | 10/1987 | McPhaul | 43/54.1 |
| 4,768,651 | 9/1988 | Lanius | 206/315.11 |
| 4,957,231 | 9/1990 | Kalisher | 224/151 |
| 5,230,452 | 7/1993 | Wagner | 224/253 |

*Primary Examiner*—Linda J. Sholl
*Attorney, Agent, or Firm*—John D. Gugliotta

[57] ABSTRACT

The present invention provides a fisherman's bait and tackle box which is compact and contoured to comfortably fit about the fisherman's waist when attached to a belt worn by the fisherman. The wearable box of the present invention organizes and provides easy access to fishing supplies and accessories, thereby eliminating the time consuming problem of searching through a conventional tackle box or vest, especially when re-rigging a broken leader while the fisherman remains wading in the water. A plurality of separate compartments neatly organize accessories such as fishing leader, bait, fishing lures, split-shot, and fishing hooks, for instance. The fishing leader is fed through a hole in the front of the present invention and can be cut at a desired length by a cutter located under the leader. Pushing a spring-tensioned dispenser button dispenses a single split shot. A rod holder is mounted on the box to permit both hands to be free to re-rig a broken leader. A preferred embodiment of the present invention has a hinged lid with a light for illumination during night fishing,

4 Claims, 5 Drawing Sheets

WEARABLE BAIT AND TACKLE BOX

BACKGROUND OF THE INVENTION

1. Field of the Invention

The present invention relates generally to a storage means for fishing accessories and, more particularly, to a bait and tackle box that is compact and contoured to be worn on a fisherman's belt for easy access to fishing supplies and accessories.

2. Description of the Related Art

As is well-known in the art, fishermen utilize a broad variety of fishing accessories including numerous hooks, lures, bobbers, sinkers, split shot, and fishing lines. Usually these fishing accessories are stored in a tackle box. A well-stocked tackle box can become heavy and difficult to transport, especially when simultaneously transporting fishing rods, coolers and the like. The tackle box usually is very cumbersome to use or handle when the fisherman is wading, for which reason it is usually left out of reach or on a river bank, dock, or pier. When a fisherman leaves the tackle box on the dock or pier the fishing gear is not readily accessible for quick changes while fishing. If the tackle box is taken out in a boat, there is the ever-present danger of it being knocked into the water and the entire contents becoming lost. These accessories often represent a significant financial and emotional investment by the fisherman.

Numerous attempts have been made to correct for the foregoing problems. For instance, U.S. Pat. No. 4,957,231, issued in the name of Kalisher, discloses a tackle box belt comprising a waist belt to which a plurality of pockets and loop hangers are selectively attached. However, the plurality of pockets and loop hangers often requires searching for the correct pocket, thereby making retrieval of desired accessories cumbersome and time-consuming, especially when attempting to quickly re-rig a fishing line that has broken off of a fishing rod in use. One attempt to overcome the problem of time-consuming searching is to provide a contoured tackle box which is wearable, one design of which is disclosed in U.S. Des. No. 263,519, issued in the name of Ader.

Consequently, a need has been felt for providing an improved bait and tackle box which is wearable on a belt to provide hands-free transportation of and easy access to a variety of fishing supplies and accessories while eliminating the cumbersome and time-consuming problem of searching through a plurality of pockets.

SUMMARY OF THE INVENTION

It is therefore an object of the present invention to provide an improved means for storage and transportation of fishing supplies and accessories.

Another object of the present invention is to provide a compact and contoured bait and tackle box for carrying fishing accessories, wherein the bait and tackle box can be attached to a belt that is worn about the fisherman's body.

Another object of the present invention is to provide a fisherman with wearable carrying means to aid in re-rigging a fishing line.

Another object of the present invention is to provide carrying means for fishing accessories which permits selective transportation of small quantities of fishing gear.

It is a feature of the present invention to provide fishing leader dispensing means with a cutter for efficient re-rigging of a broken leader.

It is a feature of the present invention to provide a plurality of accessory compartments with removable partitions for customizable organization of bait and tackle.

It is a feature of the present invention to provide magnetic fishing hook holder means for keeping hooks neat and orderly.

It is a feature of the present invention to provide interior lighting means for illumination during night fishing.

Briefly described according to one embodiment of the present invention, a fisherman's bait and tackle box is provided, wherein the box is compact and contoured to comfortably fit about the fisherman's waist when attached to a belt worn by the fisherman. The wearable box of the present invention organizes and provides easy access to fishing supplies and accessories, thereby eliminating the time consuming problem of searching through a conventional tackle box or vest, especially when re-rigging a broken leader while the fisherman remains wading in the water. A plurality of separate compartments neatly organize accessories such as fishing leader, bait, fishing lures, split-shot, and fishing hooks, for instance. The fishing leader is fed through a hole in the front of the present invention and can be cut at a desired length by a cutter located under the leader. Pushing a spring-tensioned dispenser button dispenses a single split shot. A rod holder is mounted on the box to permit both hands to be free to re-rig a broken leader. A preferred embodiment of the present invention has a hinged lid with a light for illumination during night fishing.

In accordance with a preferred embodiment, a wearable fisherman's bait and tackle box is provided for carrying fishing bait and tackle, wherein the box comprises: a contoured housing; a hinged lid attached to the contoured housing; a plurality of removable partitions within the contoured housing, wherein the partitions define a plurality of compartments for storing the bait and tackle; and attachment means for attaching the box to a belt worn by the fisherman, wherein the attachment means comfortably secures the box onto the belt in order that the box extends outwardly from the fisherman, thereby providing ready access to the stored bait and tackle by pivoting the hinged lid.

An advantage of the present invention is that it is compact and lightweight to be easily transportable to a fishing area.

Another advantage of the present invention is that it is contoured to be comfortable when attached to a belt and worn about the waist.

Another advantage of the present invention is that magnets and compartments maintain organization of accessories, thereby easing access to an individual accessory, such as a fishing fly, hook, or split shot.

Another advantage of the present invention is that the fisherman may remain in the water while re-rigging a broken fishing leader.

Another advantage of the present invention is that it is more complete and easier to use than conventional fishing vests or tackle boxes.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
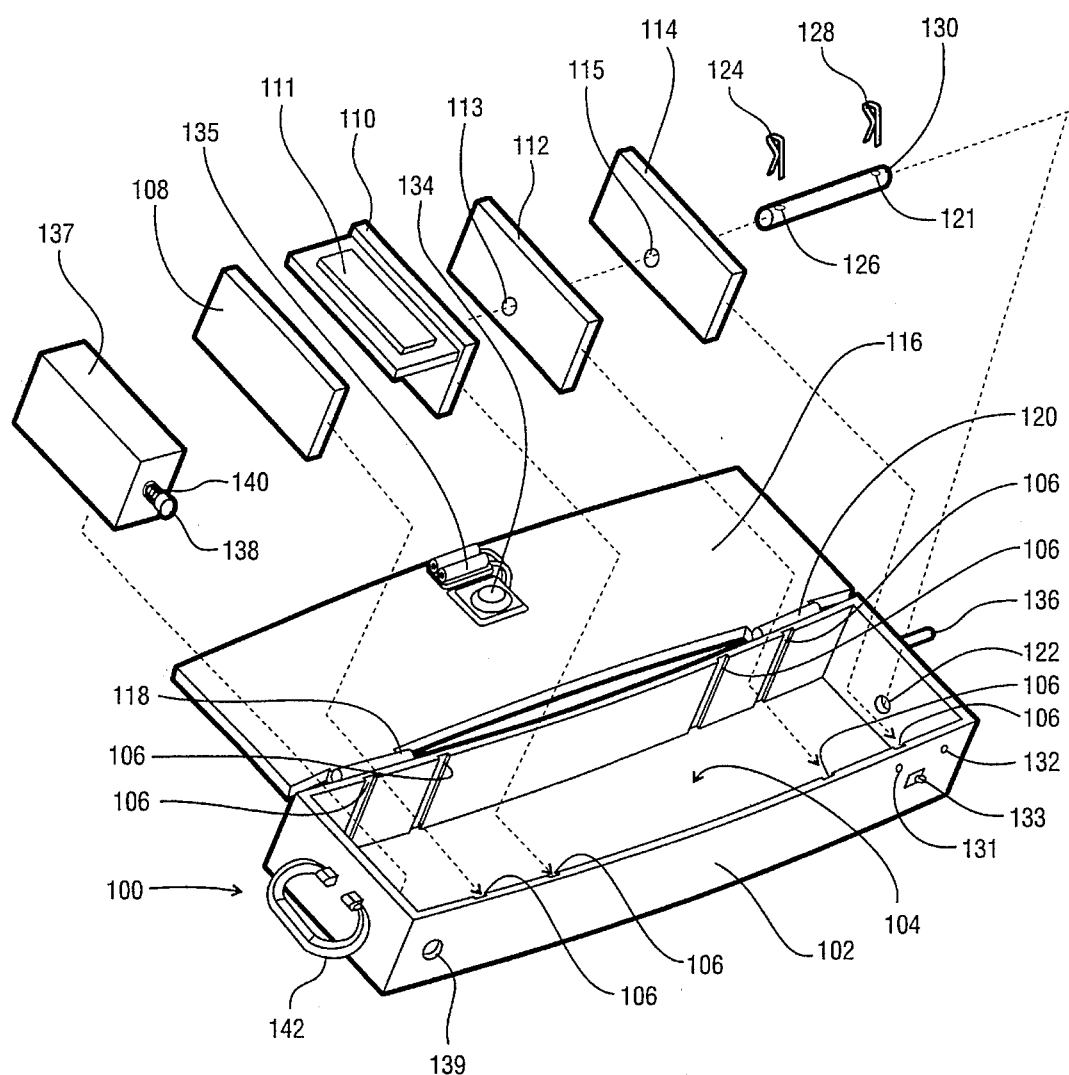
FIG. 1 is an exploded perspective view of a preferred embodiment of the present invention.

Referring now to FIG. 1, an exploded perspective view of a wearable bait and tackle box 100 is shown according to a preferred embodiment of the present invention. The bait and tackle box 100 generally comprises a housing 102, which defines an interior area 104, and selectively positioned slots 106 for receiving removable dividers 108, 110, 112, and 114 for defining multiple compartments within the interior area 104. A preferred embodiment of the housing 102 is contoured to comfortably fit along and about the waist of a user (not shown) and is manufactured of a lightweight and durable material, such as plastic. Further, a preferred embodiment of the housing 102 measures approximately 8 inches in length by 3.5 inches in width by 3 inches deep.

A lid 116 is attached to the housing 102 with a hinge 118 and 120, such that the lid 116, which is shown in FIG. 1 in an open position, may pivot about the hinges 118 and 120 to a closed position (see FIG. 3) which protects the contents within the interior area 104.

A preferred embodiment of the removable divider 110 has a magnet 111 attached thereto, thereby to magnetically attract and hold small metal objects, such as fishing hooks and flies, for instance. The magnet 111 helps to organize these small objects, thereby providing easy access to individual small objects and minimizing dropping of the small objects which would otherwise be disorganized and stuck together.

An axle 121 is inserted through an orifice 113 in the removable divider 112, through an orifice 115 in the removable divider 114, and into an orifice 122. The axle is held into place with a cotter pin 124 inserted into an orifice 126 on a first side of the removable divider 112, and a second cotter pin 128 inserted into an orifice 130 on a second side of the removable divider 112.

Figure 2:
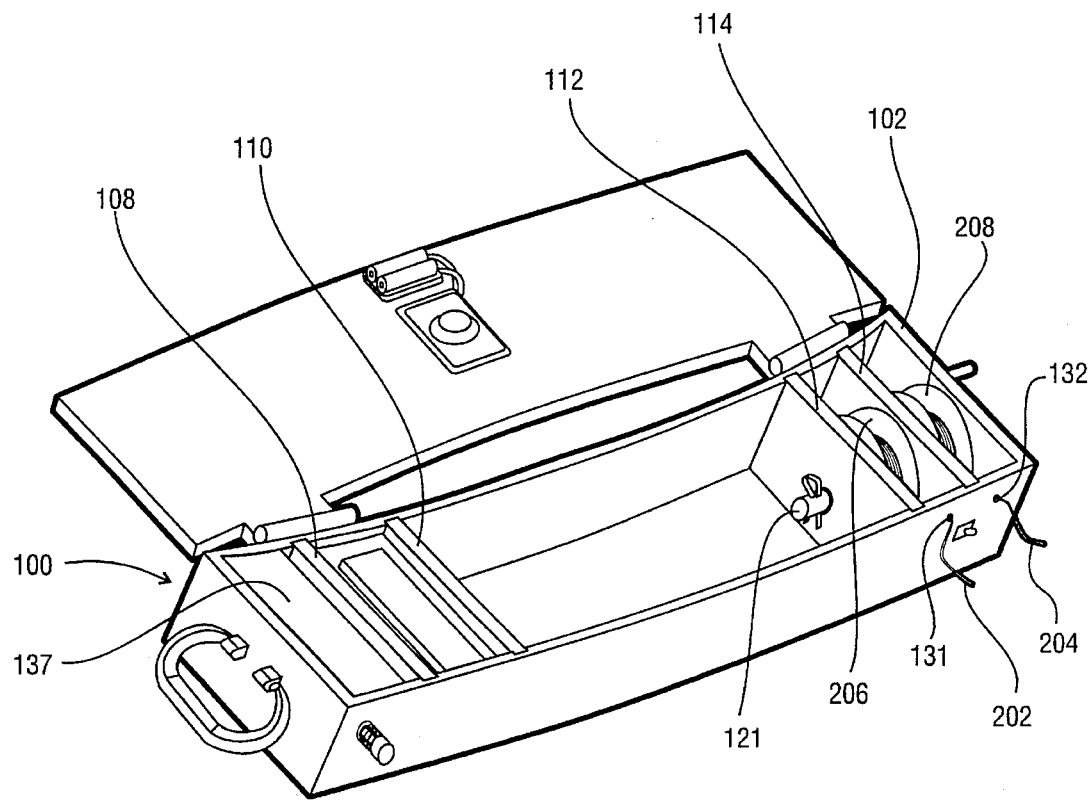
FIG. 2 is a perspective view of the preferred embodiment of FIG. 1.

An orifice 131 is provided in the housing 102, thereby to pass an end of a first fishing leader 202 therethrough from a first fishing leader roll 206 (see FIG. 2). Similarly, an orifice 132 is provided in the housing 102, thereby to pass an end of a second fishing leader 204 therethrough from a second fishing leader roll 206 (see FIG. 2).

A cutter 133 is used in a manner well-known in the art to cut the fishing leader which is dispensed through the orifice 131, 132. A preferred embodiment of the cutter 133 is similar to a conventional cutting attachment which is typically located on a conventional dental floss dispenser.

A lamp 134 mounted to the underside of the lid 116 is energized by a power supply 135 when a switch 136 mounted to the exterior surface of the housing 102 is activated, thereby to illuminate the interior area when the lid is in an open position, for use at night when re-rigging a broken fishing line.

A split shot container 137 has a dispensing button 138 which protrudes through an orifice 139 in the housing 102, and which is outwardly tensioned by a spring 140.

A fishing rod bracket 142 is mounted to an exterior surface of the housing 102, thereby to provide means for holding a fishing rod (not shown), in order that both hands may be used to re-rig a broken fishing line.

FIG. 2 shows the wearable bait and tackle box 100 ready for use with the removable dividers 108, 110, 112, 114 and the split shot container 137 in proper position. The first fishing leader roll 206 is rotatably mounted on the axle 121 in a position between the divider 112 and the divider 114. Similarly, the second fishing leader 208 is rotatably mounted on the axle 121 in a position between the divider 114 and the housing 102.

The first fishing leader 202 protrudes through the orifice 131 and may be pulled from the first fishing leader roll 206, which rotates about the axle 121. A first rubber element (not shown) is in frictional contact with the first fishing leader roll 206, thereby to maintain a fixed rotational position of the first fishing leader roll 206 until the fishing leader 202 is pulled through the orifice 131 to overcome the frictional contact with the first fishing leader roll. Similarly, the second fishing leader 204 protrudes through the orifice 132 and may be pulled from the second fishing leader roll 208, which rotates about the axle 121. A second rubber element (not shown) is in frictional contact with the second fishing leader roll 208, thereby to maintain a fixed rotational position of the second fishing leader roll 208 until the fishing leader 204 through the orifice 132 to overcome the frictional contact with the second fishing leader roll.

Figure 3:
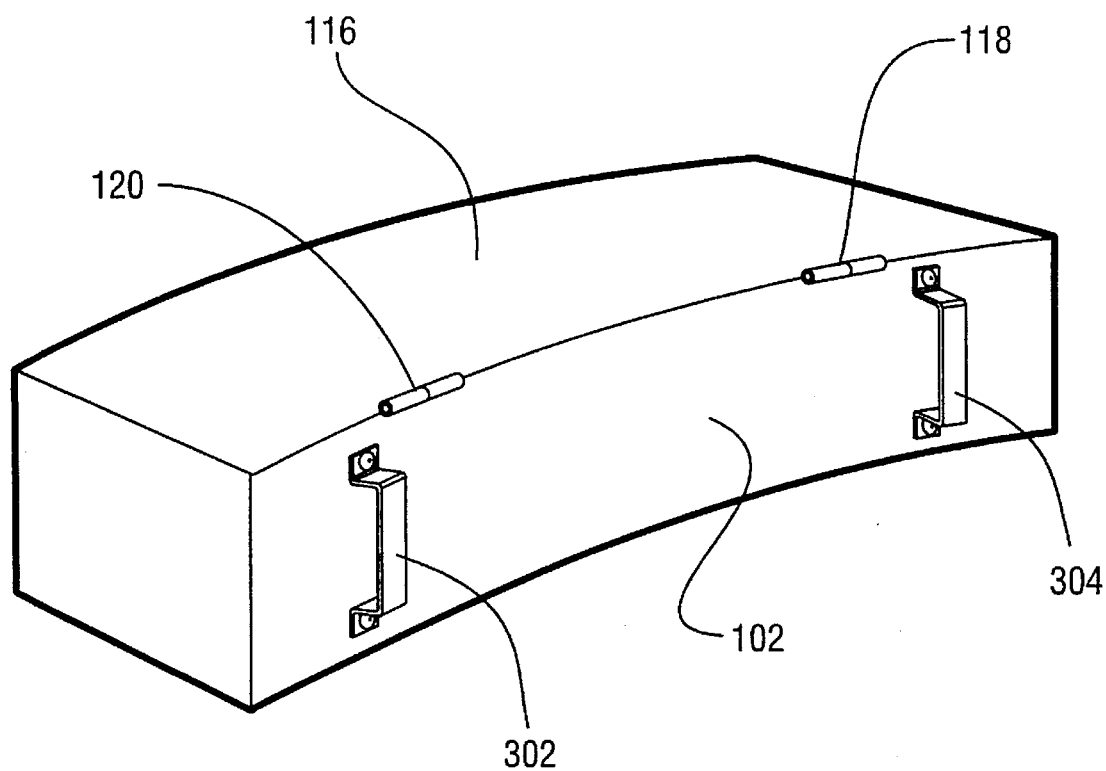
FIG. 3 is a rear perspective view showing belt attachments according to a preferred embodiment of the present invention.

FIG. 3 is a rear perspective view of the wearable bait and tackle box 100 showing belt attachments 302 and 304 according to a preferred embodiment of the present invention. A preferred embodiment of the present invention rivots the belt attachments to the housing 102. One skilled in the art will recognize that any number of belt attachments may be used without departing from the scope and spirit of the present invention.

Figure 4:
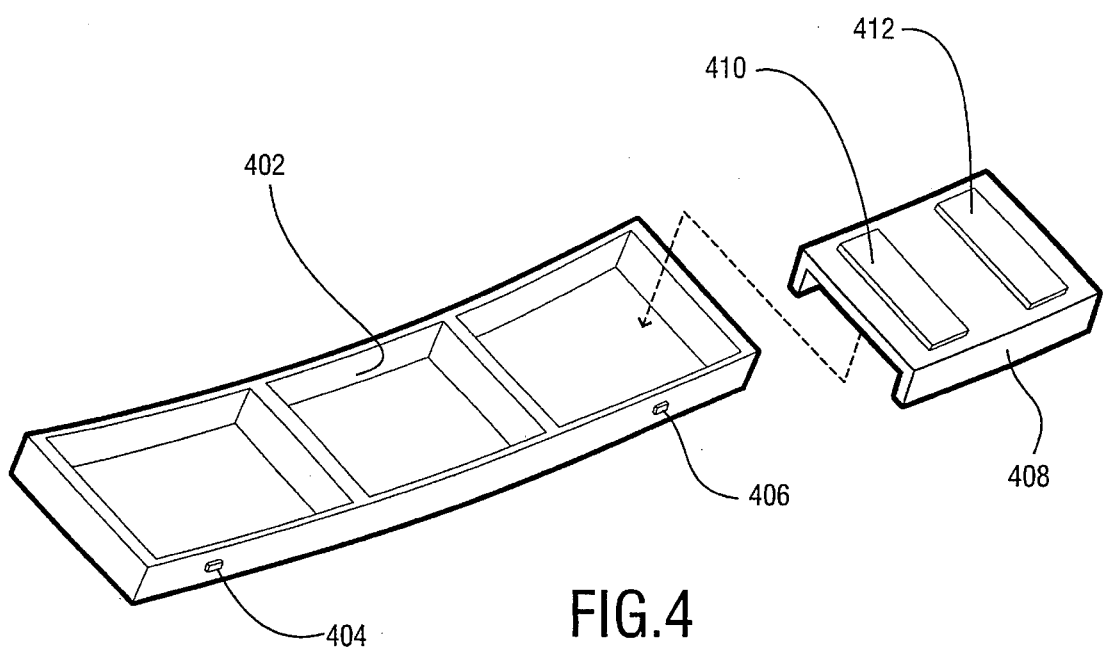
FIG. 4 is a front perspective view of a first preferred embodiment of a removable compartment tray for use within the present invention of FIG. 1.

FIG. 4 is a front perspective view of a preferred embodiment of a removable compartment tray 402 for use within the present invention of FIG. 1. The tray 402 may be placed within the interior area 104 when the removable dividers 108, 110, 112, 114 and the split shot container 137 have been removed. The tray 402 has selectively positioned tabs 404 and 406 which fit within the selectively positioned slots 106, thereby to prevent lateral movement of the tray 402 that has a smaller length than the housing 102. A preferred embodiment of the tray 402 includes a removable mini-tray 408 with magnetic strips 410 and 412, wherein the mini-tray 408 may be placed within the tray 402.

Figure 5:
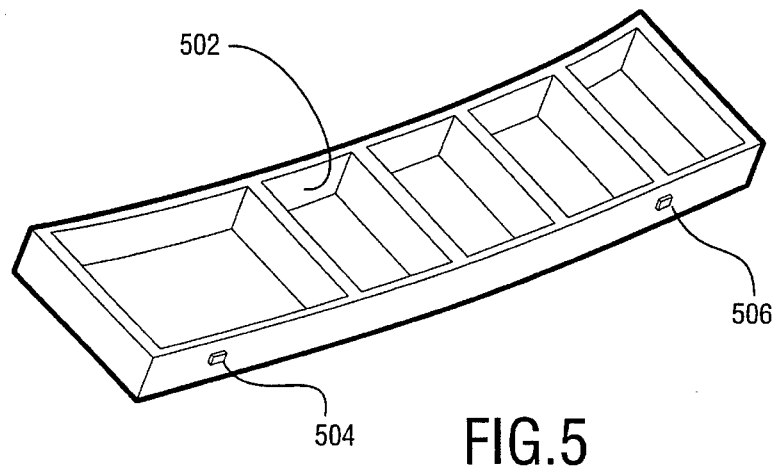
FIG. 5 is a front perspective view of a second preferred embodiment of a removable compartment tray for use within the present invention of FIG. 1.

FIG. 5 is a front perspective view of a preferred embodiment of a second compartment tray 502, which is a variation of the tray 402, for use within the present invention of FIG. 1. The tray 502 may be placed within the interior area 104 when the removable dividers 108, 110, 112, 114 and the split shot container 137 have been removed. The tray 502 has selectively positioned tabs 504 and 506 which fit within the selectively positioned slots 106, thereby to prevent lateral movement of the tray 502 that has a smaller length than the housing 102. In a preferred embodiment of the present invention, the tray 502 is placed within the interior area 104 and then the tray 402 is placed atop the tray 502. In another preferred embodiment of the present invention, the tray 502 is beneath the tray 402, and the tray 402 includes a plurality of hooks (not shown), which permit the tray 402 to be hooked onto the front side of the housing 102 to free up both hands to access the tray 502.

Figure 6:
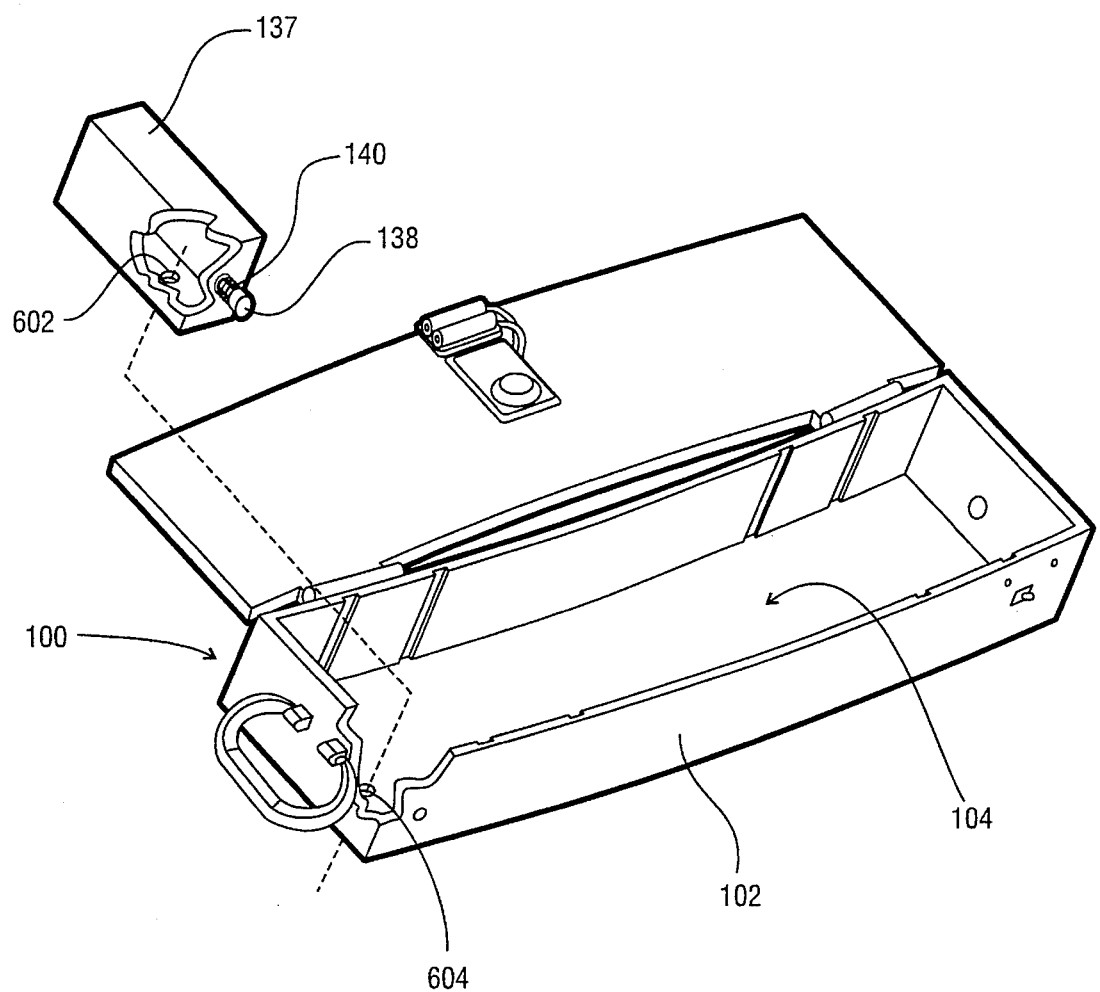
FIG. 6 is a partial cut-away perspective view showing orifices in bottom portions of a preferred embodiment of the present invention and a split shot container.

FIG. 6 is a partial cut-away perspective view of the wearable bait and tackle box 100 and the split shot container 137, thereby showing a container orifice 602 in the bottom of the split shot container, and showing a box orifice 604 in the bottom of the wearable bait and tackle box 100. When the split shot container 137 is positioned within the interior area 104, such that the dispensing button 138, which is affixed to the split shot container 137, protrudes through the orifice 139, the spring 140, which is positioned around the dispensing button 138 outside of the housing 162 (see FIG. 2), presses against the housing 102 and against the dispensing button 138, thereby urging the dispensing button 138 outwardly away from the housing 102, which thereby urges the split shot container 137 against the front of the housing 102. In this position, the container orifice 602 is out of alignment with the box orifice 604, thereby permitting the split shot container 137 to retain split shot (not shown) which is introduced into the split shot container 137, such as through an opening with a lid (not shown) on the split shot container 137, for instance.

2. Operation of the Preferred Embodiment

In operation, the present invention is attached to a user's belt (not shown) by inserting the belt through the belt attachments 302 and 304. When the belt is tightened about the user's waist, the present invention is drawn against the user's waist. The contoured housing 102 provides a comfortable surface area against the waist. The lid 116 is pivoted at the hinges 118 and 120 to an open position when accessories stored within the interior area 104 must be accessed. Individual items may be accessed and the lamp 134 may be turned on and off by activating the switch 136. The lid 116 may then be pivoted to a closed position. The first leader 202 and the second leader 204 may be pulled from the orifice 131 and 132, respectively, to a desired length and cut by gripping the leader 202, 204 within the cutter 133 in a manner well-known in the art.

Referring to FIG. 6, split shot (not shown) may be dispensed from the split shot container 138 by cupping a user's hand (not shown) beneath the box orifice 604, and then pressing the dispensing button 138 toward the spring 140, thereby compress the spring 140 and to slide the split shot container 137 away from the front of the housing 102 along the bottom of the wearable bait and tackle box 100, until the container orifice 602 aligns with the box orifice 604 to permit split shot to fall therethrough to the cupped user's hand beneath. When the dispensing button 138 is released, the spring 140 urges the dispensing button outwardly away from the housing 102, which thereby slides the split shot container 137 toward the front and the housing and moves the container orifice 602 out of alignment with the box orifice 604. Pressing and releasing the dispensing button 138 dispenses a single split shot from the split shot container. Pressing and holding the dispensing button 138 dispenses multiple split shot from the split shot container 137.

Thus, there has been shown and described a wearable fisherman's bait and tackle box for carrying fishing bait and tackle which fulfills all the objects and advantages sought therefore. Many changes, modifications, variations and other uses and applications of the subject invention will, however, become apparent to those skilled in the art after considering this specification and the accompanying drawings which disclose a preferred embodiment thereof. All such changes, modifications, variations and other uses and applications which do not depart from the spirit and scope of the invention are deemed to be covered by the invention which is limited only by the claims which follow.

What is claimed is:

1. A device for the portable storage and transportation of fishing gear, wherein the device comprises:

a contoured housing defining an interior area;

a hinged lid pivotally attached to said contoured housing, wherein said hinged lid has a closed position for protecting said interior area and an open position for accessing said interior area:

a removable partition within said contoured housing, wherein said partition defines a plurality of compartments for storing the bait and tackle;

attachment means for attaching the box to a belt worn by the fisherman, wherein said attachment means comfortably secures the box onto said belt in order that the box extends outwardly from the fisherman, thereby providing ready access to the stored bait and tackle by pivoting said hinged lid to said open position;

fishing leader dispensing means for dispensing fishing leader from a fishing leader roll stored within said contoured housing; and split shot dispensing means for dispensing an individual split shot, wherein said split shot dispensing means comprises:

a container having a front portion and a bottom portion;

a dispensing orifice in said bottom portion of said container;

a dispensing button affixed to and protruding from said front portion of said container;

a button orifice in a front portion of said contoured housing; and a spring, wherein said spring urges said front portion of said container against said housing, such that said dispensing orifice is misaligned from said housing orifice, and wherein urging said dispensing button against said spring urges said container away from pressing against said housing, thereby aligning said dispensing orifice with said housing orifice to permit dispensing of said split shot which passes through said aligned dispensing orifice and said housing orifice.

2. The device for the portable storage and transportation of fishing gear according to claim 1, wherein said removable partition comprises a magnet that magnetically attracts and holds small metal objects within said defined compartment.

3. A wearable fisherman's bait and tackle box for carrying fishing bait and tackle, wherein said box comprises:

a contoured housing:

a hinged lid attached to said contoured housing;

a removable partition within said contoured housing, wherein said partition defines a plurality of compartments for storing the bait and tackle, attachment means for attaching the box to a belt worn by the fisherman, wherein said attachment means comfortably secures the box onto said belt in order that the box extends outwardly from the fisherman, thereby providing ready access to the stored bait and tackle by pivoting said hinged lid;

fishing leader dispensing means for dispensing fishing leader from a fishing leader roll stored within said contoured housing: and split shot dispensing means for dispensing an individual split shot, wherein said split shot dispensing means comprises a container having a front portion and a bottom portion;

a dispensing orifice in said bottom portion of said container;

a dispensing button affixed to and protruding from said front portion of said container;

a button orifice in a front portion of said contoured housing;

a housing orifice in a bottom portion of said contoured housing; and a spring, wherein said spring urges said front portion of said container against said housing, such that said dispensing orifice is misaligned from said housing orifice, and wherein urging said dispensing button against said spring urges said container away from pressing against said housing, thereby aligning said dispensing orifice with said housing orifice to permit dispensing of said split shot which passes through said aligned dispensing orifice and said housing orifice.

4. The wearable fisherman's bait and tackle box according to claim 3, wherein said removable partition comprises a magnet that magnetically attracts and holds small metal objects within said defined compartment.

* * * * *